Feb. 27, 1945.  A. G. KAUFMAN  2,370,172
FUEL BURNER
Filed May 14, 1940  4 Sheets-Sheet 1

INVENTOR
ADOLPH G. KAUFMAN
BY Percy Freeman
ATTORNEY

Feb. 27, 1945.　　　A. G. KAUFMAN　　　2,370,172
FUEL BURNER
Filed May 14, 1940　　　4 Sheets-Sheet 2

INVENTOR
ADOLPH G. KAUFMAN
BY Percy Freeman
ATTORNEY

Feb. 27, 1945.     A. G. KAUFMAN     2,370,172
FUEL BURNER
Filed May 14, 1940     4 Sheets-Sheet 3
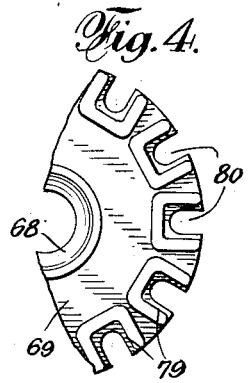
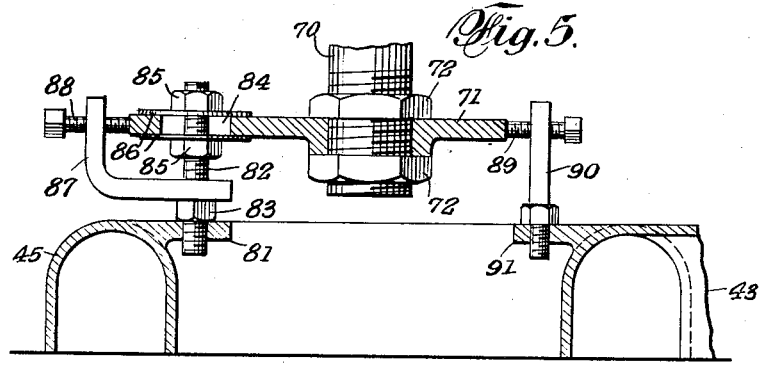
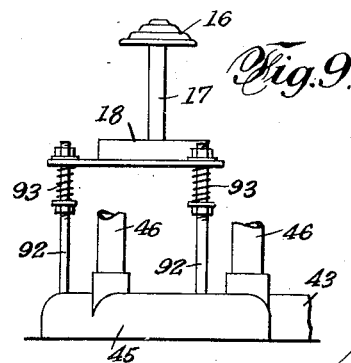
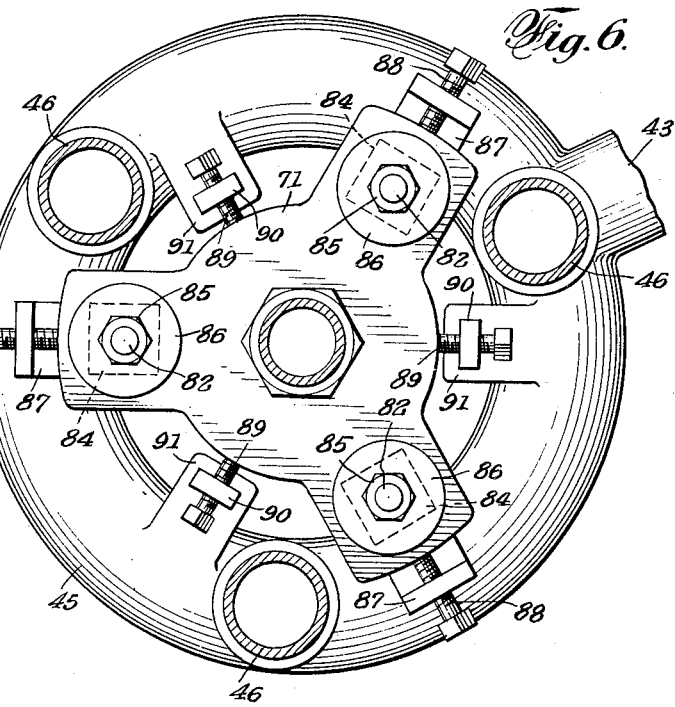
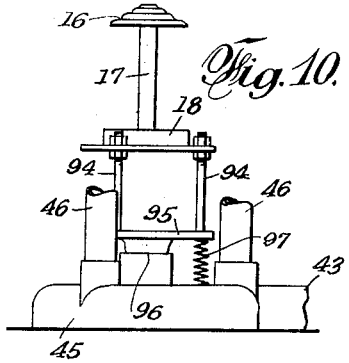
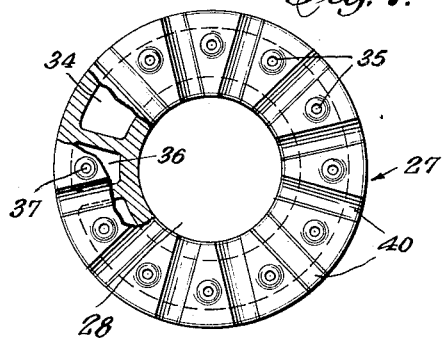
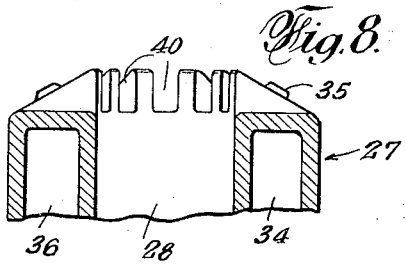
INVENTOR
ADOLPH G. KAUFMAN
BY
ATTORNEY

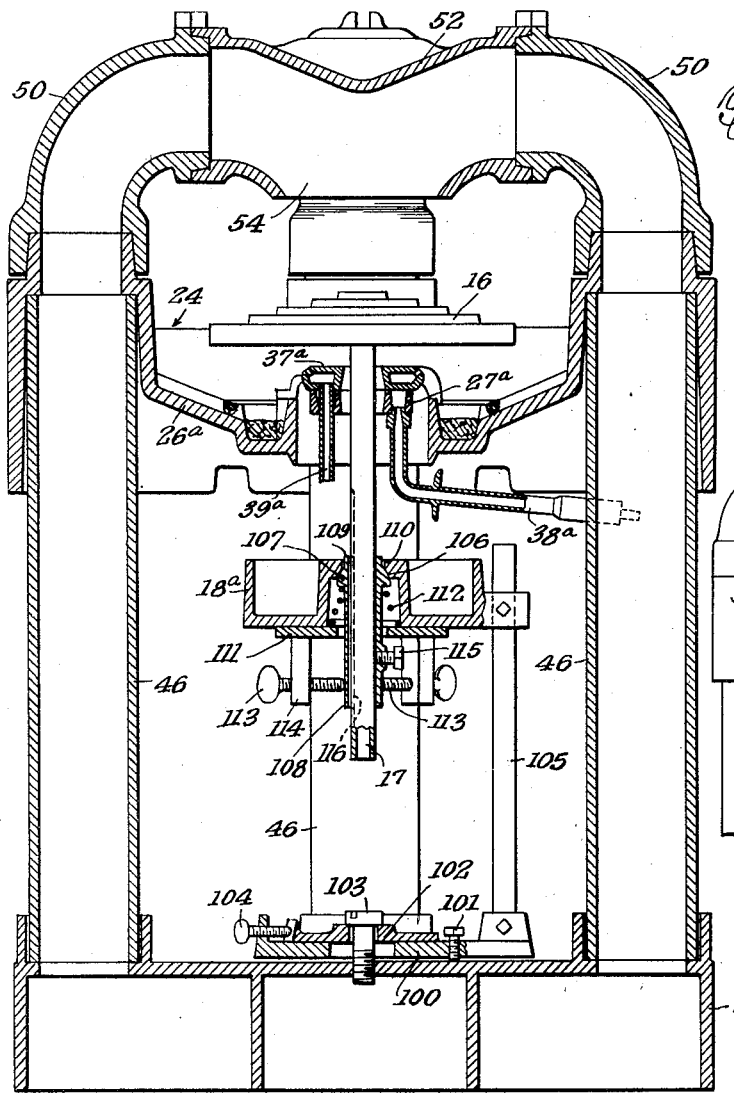
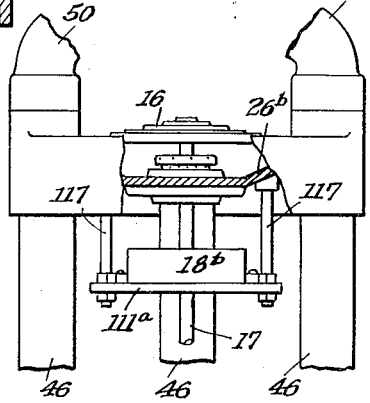
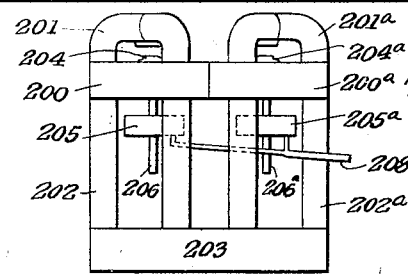
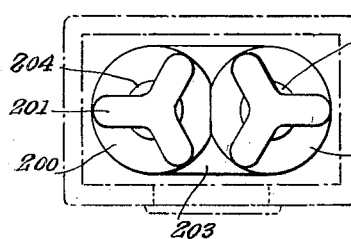
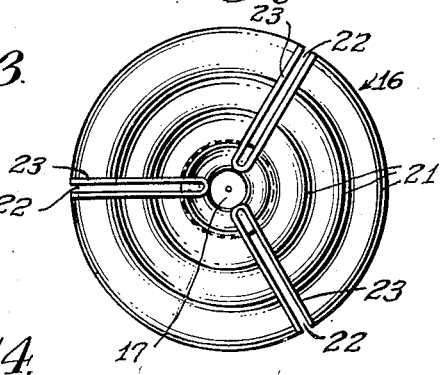
INVENTOR
ADOLPH G. KAUFMAN
ATTORNEY Patented Feb. 27, 1945

2,370,172

UNITED STATES PATENT OFFICE 2,370,172

FUEL BURNER

Adolph G. Kaufman, New York, N. Y.

Application May 14, 1940, Serial No. 335,047

9 Claims. (Cl. 158—91)

This invention relates to burners of the type in which combustion of the fuel takes place upon a plate called the generator or vaporizer, and wherein the heated condition of said generator or vaporizer causes the cracking of the fuel substance into its component parts, one of which is inflammable gas. The inflammable gas, when ignited, causes an intense flame resulting in the rapid expansion of the air in and about the burner and thus the relatively heavier outside atmosphere under positive pressure displaces the gases of combustion in a rapid and continuous stream.

The invention contemplates a novel form of burning device wherein the supply of air is conducted by passages and directors to cascade downward on top of the generator or vaporizer in such a manner as to cause the flame to spread or mushroom outward against the combustion area to be heated.

The invention contemplates a novel form of oil burner in which the conduits and passages for supplying air to the vaporizer are arranged in a novel manner and wherein the installation of the burner is rendered flexible to obtain a desired operation.

The invention also contemplates the provision of an improved vaporizer which may be made in various sizes and which is constructed to obviate warping and cracking.

Another feature of the invention resides in the provision of a burner unit provided with an air manifold in the upper portion thereof and with passages communicating said manifold with the lowermost portion of a furnace or boiler so that the air supplied to the vaporizer positioned below the manifold, is drawn from the lowermost, and hence the coolest portion of the room in which said boiler or furnace is situated.

The invention also contemplates a burner which may selectively burn either oil or illuminating gas, and includes provisions for preventing flooding of the oil should the pilot burner used for pre-heating the vaporizer, become extinguished.

The provision of means for centering the vaporizer in relation to the air manifold also forms an important feature of the invention.

In addition to the above, the invention also contemplates the provision of means for leveling the vaporizer so that proper operation may be obtained.

Another feature of the invention resides in a novel form of gas supply unit, said unit incorporating a pilot burner formed integral with but isolated from the remainder of said burner.

Another object of the invention is to provide means for absorbing and burning off any oil which may not be consumed on the vaporizer, the combustion of said excess oil serving to further heat said vaporizer to intensify the fire supported thereon.

In addition to and also apart from the above features, objects, and advantages of the invention, the arrangement of the various parts as shown in the accompanying drawings in their present preferred embodiments, constitute contemplated improvements in the construction of burners of the instant type.

In the accompanying drawings in which, by way of example, are shown several forms of burner incorporating features of the invention:

Fig. 4 is a fragmentary plan view of a detail of construction.

Fig. 5 is a fragmentary vertical sectional view showing an alternate form of support, including means for leveling and for centering, for the vaporizer plate.

Fig. 6 is a top plan view thereof.

Fig. 7 is a top plan view, partially broken away, of a gas burner.

Fig. 8 is a vertical sectional view of the top portion thereof.

Figs. 9 and 10 are small scale schematic elevational views, each showing alternate means for supporting and centering the vaporizer plate.

Fig. 11 is a vertical sectional view of a burner of modified design.

Fig. 12 is a fragmentary elevational view, partly in section, illustrating a modification of the burner shown in Fig. 11.

Fig. 13 is an elevational view of a two-part burner.

Fig. 14 is a plan view thereof as positioned within a boiler.

Fig. 15 is a plan view of the vaporizer plate shown in Fig. 1.

Figure 1:
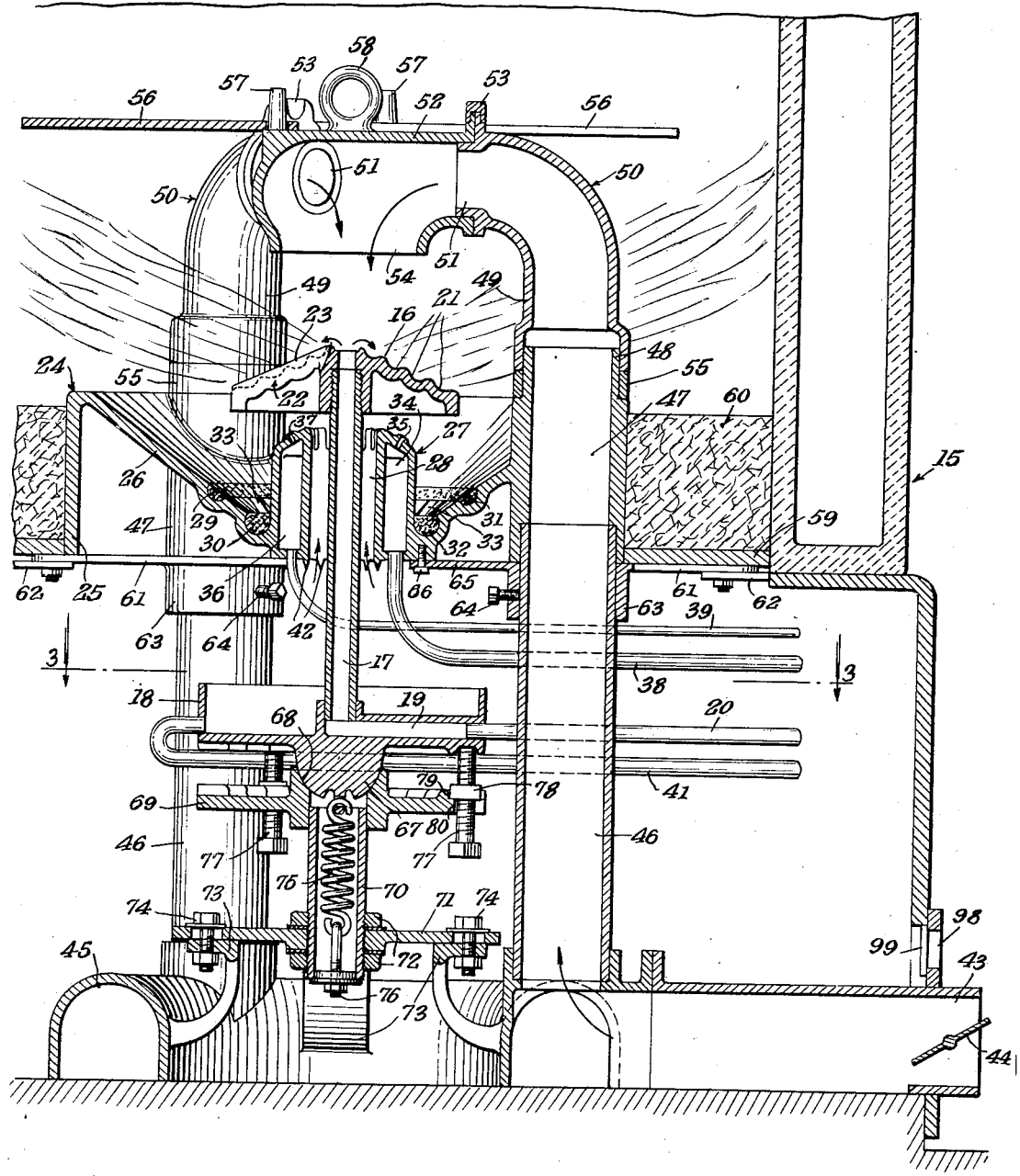
Fig. 1 is a vertical sectional view through a portion of the lower part of a boiler and having installed therein a burner such as contemplated in the present invention.
Figure 2:
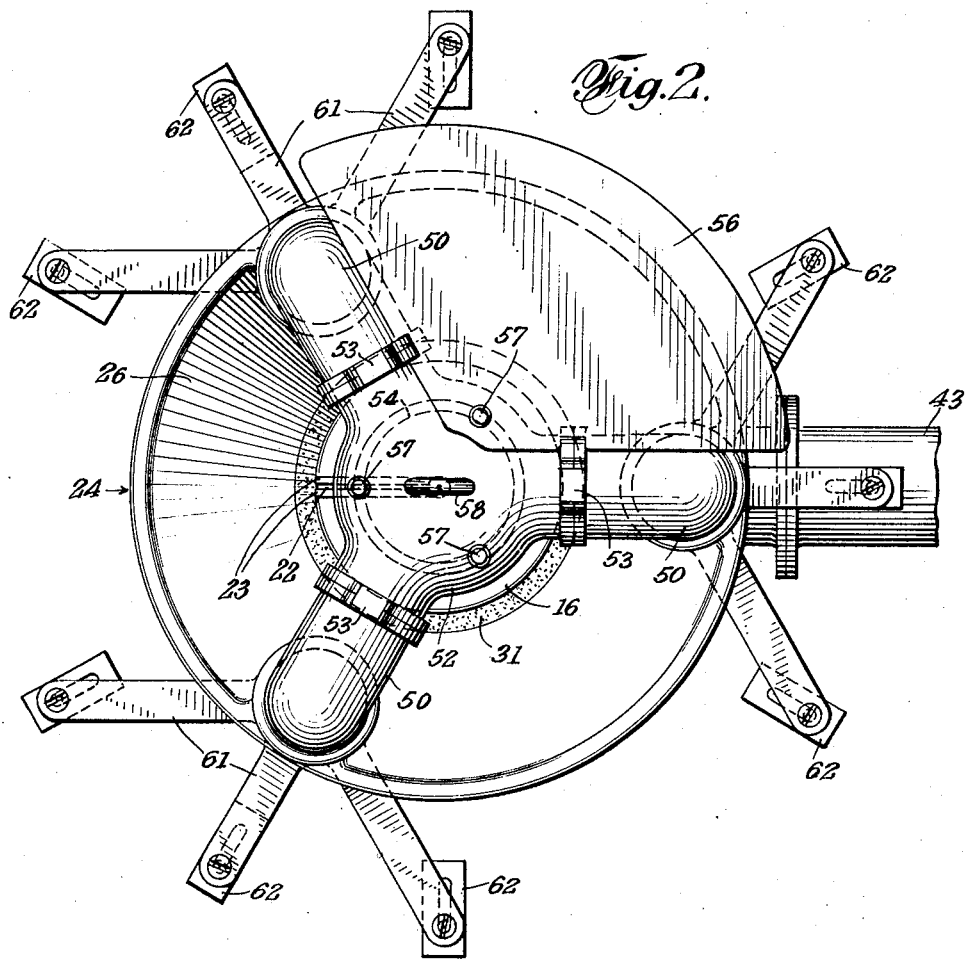
Fig. 2 is a top plan view of the burner, certain deflecting plates being removed for clearer illustration.
Figure 3:
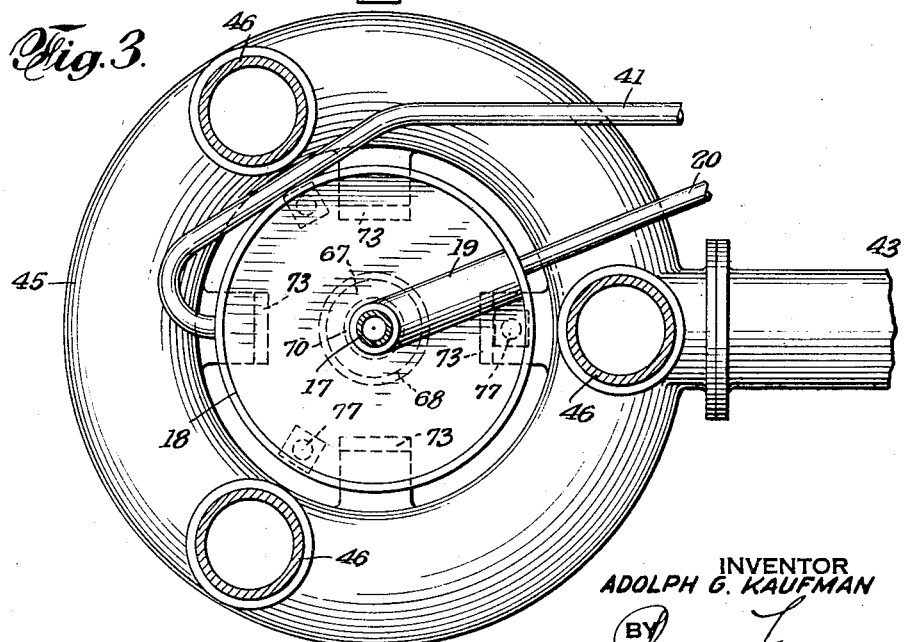
Fig. 3 is a sectional view taken substantially on the line 3—3 of Fig. 1.

Referring now to the drawings in greater detail, the burner may be incorporated in any device such as a furnace or boiler 15 in which, preferably, the grate is removed, the contemplated assembly of the burner being self-supporting.

The burner comprises a vaporizer 16 removably carried by a tube or pipe 17 supported in an upright position by a drip or overflow pan 18. The latter may be cored as at 19 to provide a communication between the pipe 17 and an oil inlet line 20 which is preferably connected to a gravity feed oil tank (not shown).

The vaporizer plate 16, as at present conceived, is formed as a substantially conical member having a series of concentric circular ribs and grooves 21. These grooves are so formed and so correlated as to cause oil supplied through the pipe 17 to cascade down the surface of said plate and toward its outer rim. In this manner the oil is retarded in its flow to afford time for proper cracking thereof.

During combustion of the oil the vaporizer plate becomes quite hot and is subjected to forces tending to warp and fracture it. To obviate this, said plate is preferably formed with one or more slots 22 to afford freedom of expansion of said plate. To prevent oil from passing through said slot or slots, each is provided with walls or barriers 23 defining the edges of said slots.

The vaporizer plate is positioned substantially centrally of a burner base 24, said base being formed with a skirt portion 25 and an inverted hollow conical portion 26, and including a gas burner assembly 27 formed with an opening 28 through which the pipe 17 freely passes. The conical portion or web 26 is preferably formed with one or more grooves 29 and 30 into which the respective asbestos or similar non-combustible packings 31 and 32 may be placed. Communicating the grooves 29 and 30 there may be provided a plurality of radial grooves 33. Thus, any oil which drips from the peripheral edge of the vaporizer will be collected by the packing 31 and burned therein should the temperature at that point be sufficiently high, or passed from said packing 31 by means of the grooves 33 to the packing 32 to be burned at that point. In any event, with the vaporizer in operation sufficient heat will be generated in the vicinity of the mentioned packings to cause combustion of any oil which may find its way to them.

The burner unit 27 is preferably formed with a hollow gas chamber 34 and is provided with a plurality of burner tips 35 positioned so as to direct a gas flame emanating from said tips in an upward direction. This burner is also formed with a separate pilot gas chamber 36 having a burner tip 37. Gas may be supplied to the chamber 34 as by means of a pipe 38 and the pilot chamber may be similarly supplied through the smaller pipe 39.

In normal operation only the pilot light is employed for pre-heating the generator or vaporizer before operation of the burner is started. However, should the oil supply fail, and heat be desired, the vaporizer plate 16 may be replaced by any well-known form of deflecting plate and gas supplied through the pipe 38 so that a highly efficient gas flame is provided.

It will be noted that the gas burner 27 (Figs. 7 and 8) is formed in its upper portion with grooves 40. These are provided to permit oil, falling from the vaporizer plate into the sump formed between the gas burner and the web 26, to flow off into the drip pan 18 without fouling the gas burner. This latter condition may obtain should the pilot light become extinguished. The oil flowing in the overflow pipe 41 may be made to give warning of the fact that the oil is being fed to the burner but not being consumed. For this purpose, although not shown, a drip bucket or the like may cause, when filled, operation of suitable signaling means.

The oil which may pass through the passage 28 during failure of the burner is more readily directed toward the drip pan 18 and not permitted to flow and spread along adjacent parts, by providing means such as the projections 42. Said projections are directed downwardly to collect the oil so that it may drop therefrom into the drip pan.

Primary air is supplied to the burner through an inlet 43 controlled as by a butterfly valve 44. This inlet is preferably positioned at the lowermost point of the boiler or furnace and air passing therethrough is directed to the base manifold 45 to which are connected the vertically disposed air conduits, 46. It is preferred to form the base manifold 45 and connecting portions of the inlet 43 open at the bottom so that the air passing therethrough maintains contact with the furnace floor to keep the temperature of the air at this point as low as possible.

Each of the conduits 46 is arranged to enter and communicate with a passage 47 formed in the burner base 24. Said passages are extended above the top of the burner base to form collars 48 over which are fitted the downwardly directed legs 49 of the elbow fittings 50. The horizontal legs 51 of these fittings are commonly directed towards the center of the burner and connected by a manifold member 52 as by means of the clips 53 engaged over coacting flanges of the elbows and the manifold member. The latter is formed with a downwardly directed opening 54 directly over the vaporizer 16 whereby air from the inlet 43 is directed towards the top surface of said vaporizer.

In order to render this assembly quite flexible so the air opening may be properly positioned in relation to the vaporizer, spacing rings such as shown at 55 may be interposed between the elbows 50 and the burner base 24, or a manifold suitable to a particular installation may be fitted to the elbows so the air opening 54 has a desired positional relation to the vaporizer.

The air manifold above described may also serve to support means for deflecting the flame towards the walls of the boiler or furnace. Such means may comprise the deflector plates 56 removably held in position as by means of the lugs 57. A lifting-ring may be formed with the manifold member 52 such as shown at 58.

While three air conduits have been illustrated, it is apparent that any given number may be used to obtain a desired operation, the flame passing to the boiler or furnace walls between the vertical legs of the manifold. The foregoing construction also permits a smooth uninterrupted flow of air to the vaporizer, said flow being induced by the differential in temperature of the air inlet 43 and air outlet 54.

In order to obtain this desired operation, the burner is sealed against air coming to the vaporizer laterally. For this purpose a sealing ring 59 is provided to encircle the burner and set within the furnace walls and said ring then serves to support a mass 60 of non-inflammable material such as asbestos.

The mentioned ring 59 may be supported as on the radiating fingers 61 carried by the conduits 46 or any other suitable portion of the burner and said fingers may also be provided with adjustable end portions 62 which serve to center the burner in the boiler or furnace. The fingers are preferably integrally formed on collars 63 which may be secured to the conduits as at 64 and said collars may be provided with inward extensions 65 secured to the burner base at 66.

So that proper operation of the burner may be had, it is preferred to provide means for leveling the vaporizer and for centering said generator in relation to the air manifold.

As shown in Fig. 1, the drip pan 18 may be formed with a spherical extension 67 having engagement in a seat 68 formed in the center of a plate 69, the latter being carried by a pipe 70 or the like. The latter may be locked in vertically adjustable position in relation to the support plate 71 by means of lock nuts 72. The plate 71 may be carried by brackets 73 formed either on the air ring 45 or on a separate base portion, and means such as the bolts 74 may serve to lock said plate to said brackets in any adjusted lateral relation whereby the center line of the pipe 70 and hence the vaporizer 16 is definitely centered in relation to the air manifold.

The drip pan is held assembled to the plate 69 by means such as the tension spring 75 having one end hooked to the extension 67 and the other adjustably held as at 76. In this manner the vertical condition of the tube 17 and the level condition of the vaporizer 16 may be obtained and said condition maintained by means such as the leveling screws 77, carried by the plate 69 and impinging against the bottom of the drip pan.

A preferred form of leveling screw is shown, said screw being provided with a nut 78 selectively positioned in any of the seats 79 to obviate rotation of said nut to thus facilitate easy manipulation of said screw for leveling the vaporizer. The various slots 80 are provided to render more flexible the adjustment of the vaporizer.

Figs. 5 and 6 illustrate a preferred construction for centering the vaporizer. In this arrangement the base manifold is preferably formed with inwardly directed lugs 81 which are tapped for the screw studs 82, said studs being adjustably positionable in vertical relation and locked in such position as by means of the nuts 83. The plate 71 may be formed with relatively large openings 84 through which pass the upper ends of the screw studs and said plate may be supported and locked in position as by means of the nuts 85. To complete the assembly, washers 86 are interposed between each of said nuts and the associated surfaces of said plate. Thus, there is provided additional means for vertically positioning the plate 71 and hence the vaporizer.

To afford lateral adjustment of the vaporizer, each stud 82 carries a bracket 87 having a tapped upwardly directed leg for a set screw 88 which is arranged to impinge against a peripheral portion of the plate 71. The screws 88, preferably three in number, thus serve to laterally position the plate 71 and hence the vaporizer. In order to lock said plate in adjusted position, a number of set screws 89 carried by brackets 90 from lugs 91 formed on the base manifold 45, may be provided to engage peripheral portions of the plate intermediate the set screws 88.

As shown in Fig. 9, the vaporizer and drip pan may be supported on studs 92 fixed to the base manifold 45 and yieldably supported as by coil springs 93 arranged about said studs.

In the form of assembly shown in Fig. 10, the vaporizer and drip pan assembly is carried by studs 94 fixed to a plate 95 having a ball and socket association with the base manifold 45 as at 75, 96. Springs 97 or similar means may be provided for adjustably leveling said assembly.

The passage 28 in the burner base may be utilized for secondary air, said air being adapted to be supplied through an opening 98 controlled in size as by means of a shutter 99.

The modified form of the burner shown in Fig. 11 is essentially similar to that shown in Fig. 1 with the exception that four conduits 46 are employed to conduct air from the base manifold 45 to the upper air supplying means terminating in the downwardly directed opening 54, and that the vaporizer 16 and the drip pan 18 are differently mounted for accurate adjustment.

As illustrated, a plate 100 is supported on the base manifold 45 and may be leveled relative thereto as by means of the screw 101. The plate 100 is locked to its support as by means of the locking plate 102 held by the bolt 103 firmly to the base manifold 45. Means such as the screw 104, threadedly engaged in the plate 100 and engaged with the locking plate 102, may be employed for centering said plate as desired.

The plate 100 is fitted with a post 105 upon which is carried the drip pan 18. The latter, in this instance, is formed with a spherical seat 106 against which is engaged the hemi-spherical portion 107 of a sleeve 108 arranged vertically. To prevent rotation of said sleeve, means such as the polygonal portion 109 of the sleeve may be disposed in a similarly shaped opening 110 in the drip pan.

A bracket plate 111 is fixed to the drip pan to form an abutment for the compression spring 112 which urges the hemi-spherical portion 107 against its seat 106. The plate 111 is formed with an opening through which the sleeve 108 protrudes and screws 113 mounted in bracket lugs 114 on the plate 111, are arranged to impinge the protruding sleeve portion so the same may be adjusted for perpendicular position. The tube or pipe 17 is locked to the sleeve 108 as by a set screw 115 and may be held non-rotationally therein as by the key means 116. As previously described, the tube 17 serves to support the generator or vaporizer 16.

In the above manner, the vaporizer plate 16 may be leveled, centered, and accurately vertically positioned with respect to the other parts of the burner in a quick and easy manner.

In the form of the invention shown in Fig. 11, the means for supplying gas to the burner is somewhat differently designed from that described for Fig. 1, but the mode of operation which is obtained, is the same. The pilot burner 37ª is supplied by the line 39ª and the main burner 27ª is supplied by the line 38ª.

As shown in Fig. 12, the vaporizer 16 and the drip pan 18ᵇ may be carried from the conical web portion 26ᵇ of the burner base 24, the construction being otherwise similar to that described for Fig. 11. The bolts 117, adjustably engaged with the plate 111ª may be employed for this purpose. The plate 111ª may, of course, be omitted and the bolts fastened directly to the drip pan 18.

Frequently a boiler or furnace has a fire door and other openings too small for the insertion of burner parts commensurate in size with the capacity of burner required by such boiler or furnace. As shown in Figs. 13 and 14 under the above conditions, said boiler or furnace may be fitted with a two or more part burner of equal or better efficiency than that of a single larger burner.

In this assembly, the burner comprises the burner bases 200 and 200ª, each provided with an air manifold 201 or 201ª connected by air conduits 202 and 202ª with a common air ring 203 or with two air rings. The burner bases 200 and 200ª may be placed in abutting relation as shown and suitably secured together as by bolts or the like.

The vaporizers 204 and 204ª may be supported in any of the ways previously described and provided with drip pans 205 and 205ª having a communicating passage or with a common drip pan. In this assembly, each burner is provided with a separate oil feed line 206 and 206ª, but preferably with a common oil overflow line 208.

The burners may be operated separately or together to give a flexibility of operation not possible with a single larger burner and at an efficiency considerably higher. The portions of the flame of each burner, which are directed towards each other serve to heat the center of the boiler or furnace, a condition desirable with certain type of construction of such devices.

While the foregoing is quite detailed, it is obvious that numerous changes in the construction and arrangement of the burner parts may be made within the spirit and scope of the invention as defined in the following claims.

What I claim as new and desire to secure by Letters Patent, is:

1. A burner of the character described comprising a burner base having a plurality of peripherally arranged passages, an air manifold connected with said passages and having a central downwardly directed opening, a vaporizer positioned beneath said opening and having a central fuel inlet, a fuel overflow pan below and arranged to support said vaporizer and having a passage communicating with said fuel inlet, a fuel connection to said pan, means for conducting air to said opening, means for leveling said vaporizer, and adjustable means for centering and raising said vaporizer in relation to said opening.

2. In a burner of the character described, a burner base comprising a member having a plurality of primary air passages therethrough, said base being provided with an inverted conical wall, and with a gas burner unit integrally formed with said wall, said latter unit being formed with a central vertical secondary air passage, and a vaporizer associated with said burner base and positioned above said gas burner unit for receiving air passing through all of the mentioned air passages, means to supply liquid fuel to the vaporizer said vaporizer having a central fuel inlet, and said conical wall being provided with means for receiving fuel passing from said fuel inlet along the surface of said vaporizer and unvaporized by or on the vaporizer.

3. A burner of the character described comprising a vaporizer having a central fuel inlet, an air supply manifold arranged above said vaporizer and comprising a plurality of inwardly directed elbow members, a central member, means for removably connecting said elbow members with said central member, said latter member having a downwardly directed air opening, means for adjustably varying the vertical relation between the vaporizer and the manifold, and means for leveling said vaporizer, and means for centering the vaporizer in relation to the manifold opening.

4. In a fuel burner of the character described, a vaporizer comprising a plate having a central fuel inlet and formed with substantially radial slots to obviate warping and fracturing of said plate under intense heat, the top surface of said plate being formed with a series of concentric alternate grooves and ridges to retard the flow of fuel along said surface, and barriers higher than said ridges provided at the walls of said slots.

5. In a burner of the character described, a vaporizer having a central fuel inlet, an overflow pan supporting said vaporizer, said central fuel inlet extending through said overflow pan, means for conducting air to the top surface of the vaporizer, said means comprising an air inlet member, an air manifold, above the air-inlet member, conduit connections between the inlet member and the manifold, said manifold having an opening directed toward the vaporizer, means for leveling the vaporizer, means for centering the vaporizer relative to the opening in the manifold and means for vertically adjusting the vaporizer in relation to the manifold, means for supporting the overflow pan and means for vertically adjusting the overflow pan, all said last four means being accessibly located remote from the heat zone of the vaporizer.

6. In a burner of the character described, a vaporizer having a central fuel inlet, an overflow pan supporting said vaporizer, a fuel tube formed with the pan, said central fuel inlet extending to and communicating with said overflow pan tube, means for conducting air to the top surface of the vaporizer, said means comprising an air manifold, a controllable air-inlet member, conduit connections between the inlet member and the manifold, said manifold having an opening directed toward the vaporizer, means for leveling the vaporizer, said means comprising a support for the overflow pan and a universal joint between the overflow pan and its support, means for centering the vaporizer relative to the opening in the manifold, and means for vertically adjusting the overflow pan.

7. In a burner of the character described, a burner base comprising a member having a plurality of air passages therethrough, said base being provided with an inverted conical wall and with a gas burner unit located axially of said conical wall, a vaporizer associated with said burner base and positioned above said gas burner unit for receiving air passing through all of the mentioned air passages, said vaporizer being provided with a central fuel inlet and said conical wall being provided with means for receiving the drippings of any unconsumed fuel passing from said fuel inlet along the surface of said vaporizer.

8. In a burner of the character described, a vaporizer having a central fuel inlet, an overflow pan supporting said vaporizer, a fuel tube formed with said pan, said central fuel inlet extending to and communicating with said overflow pan tube, means for conducting air to the top surface of the vaporizer, said means comprising an air inlet member, an air manifold above the air-inlet member, conduit connections between the inlet member and the manifold, said manifold having an opening directed toward the vaporizer, means for leveling the vaporizer, means for centering the vaporizer relative to the opening in the manifold and means for vertically adjusting the vaporizer in relation to the manifold, means for supporting the overflow pan, and means for vertically, horizontally, and laterally adjusting the overflow pan, all of said last four means being accessibly located remote from the heat zone of the vaporizer.

9. A removable assembly for use in and as part of a fuel oil burner comprising a base, a support plate, means for leveling said support plate relative to said base, means for adjustably positioning said support plate relative to the remainder of the fuel oil burner, means for clamping the support plate to said base in adjusted position, a vertical post on said support plate, an overflow pan vertically and horizontally adjustably supported on said post, a fuel pipe supported by said overflow pan and a vaporizer for the oil burner supported on the upper end of said fuel pipe.

ADOLPH G. KAUFMAN.